United States Patent [19]

Satoh

[11] Patent Number: 5,129,607
[45] Date of Patent: Jul. 14, 1992

[54] CLAMP

[75] Inventor: Tomoaki Satoh, Utsunomiya-shi, Japan

[73] Assignee: Nifco, Ltd., Yokohama, Japan

[21] Appl. No.: 741,909

[22] Filed: Aug. 8, 1991

[30] Foreign Application Priority Data

Aug. 25, 1990 [JP] Japan ............................ 2-88906[U]

[51] Int. Cl.⁵ .............................................. F16L 3/00
[52] U.S. Cl. ......................................... 248/73; 248/742
[58] Field of Search ................ 248/74.1, 74.2, 74.3, 248/74.4, 68.1, 73; 24/453, 297, 458, 530, 545

[56] References Cited

U.S. PATENT DOCUMENTS

| 4,566,660 | 1/1986 | Anscher et al. | 248/74.2 |
| 4,635,886 | 1/1987 | Santucci et al. | 248/73 |
| 4,917,340 | 4/1990 | Juemann et al. | 248/74.2 |
| 4,967,987 | 11/1990 | Swank | 248/68.1 |

FOREIGN PATENT DOCUMENTS

| 59-133886 | 6/1983 | Japan . | |
| 2040348 | 8/1980 | United Kingdom | 248/74.2 |
| 2092216 | 8/1982 | United Kingdom | 248/74.2 |

Primary Examiner—David L. Talbott
Attorney, Agent, or Firm—Schwartz & Weinrieb

[57] ABSTRACT

A plastic clamp for an elongated body includes a pair of opposed side walls and a bottom wall extending between the side walls so as to define a pair of end openings and an upper opening, an engaging piece extending in an inclined manner from an upper portion of at least one of the side walls toward a lower portion of the opposed side wall, and a resilient supporting piece provided upon an inside surface of at least one of the side walls so as to extend from one of the end openings to the other end opening and have a distal end thereof positioned close to the opposed side wall.

6 Claims, 4 Drawing Sheets

CLAMP

BACKGROUND OF THE INVENTION

1. Field of the Invention

The present invention relates to a clamp for retaining a pipe, cord, cable or operational or functional rod (hereinafter referred to collectively as an elongated body) at an axially central portion thereof and, more particularly, to such a clamp which is capable of clamping elongated bodies of different diameters.

2. Description of the Prior Art

Various clamps have been used for routing elongated bodies within, or retaining such bodies upon, for example, an appliance, as disclosed within Japanese Patent Public Disclosure No. 59-133886.

Ordinary or conventional clamps of the type described above and used for retaining an elongated body at an axially central portion are constructed such that the elongated body can be inserted in a radial direction into the clamp body and retained therein. A typical example of a clamp of this type comprises a clamp body having a bottom provided with a semicircular groove for admitting an elongated body in the radial direction and a pair of opposed side walls which are provided with engaging pieces which extend downwardly in any inclined manner from the upper ends of the side walls. The elongated body is inserted into the clamp body in such a manner as to urge the engaging pieces away from each other and is retained therein by means of the restored engaging pieces in cooperation with the semicircular groove.

However, the prior art clamps impose restrictions upon the diameter of the elongated bodies which can be accommodated therein. Specifically, elongated bodies having a large diameter cannot be inserted into the clamp body at all, whereas those of a small diameter are accommodated loosely within the clamp body and cannot be retained firmly within the clamp body.

Therefore, it has been necessary to or manufacture a plurality of different clamps capable of retaining elongated bodies of different diameters and to subsequently select among these clamps in accordance with the diameter or cross-sectional profile of the particular elongated bodies body to be accommodated or secured, the corresponding clamp for suitably retaining the same

OBJECT OF THE INVENTION

The main object of the present invention is to provide a clamp which is capable of reliably retaining an elongated body at an axially central portion thereof and which is usable for retaining various elongated bodies of different diameters.

SUMMARY OF THE INVENTION

In order to attain the above object there is provided in accordance with the present invention a plastic clamp comprising a pair of opposed side walls and a bottom wall, extending between the side walls so as to define a pair of end openings an, upper, opening, an engaging piece extending in a downwardly inclined manner from an upper portion of at least one of the side walls toward a lower portion of the opposed side wall, and a resilient supporting piece provided upon an inside surface of at least one,,of the side walls so as to extend axially from one of the end openings to the other one of the end openings and to have a distal end positioned close to the opposed side wall.

With this construction, when an,. elongated body is push against the at least one engaging piece in the downward direction, the engaging piece is flexed, and the elongated body is inserted between the side walls below the engaging piece and resiliently supported by means of at least one resilient supporting piece extending radially inwardly from one of both side walls normal to the axis of the elongated body.

BRIEF DESCRIPTION OF THE DRAWINGS

The above and other objects, characteristic features and advantages of the present invention will become more apparent from the following description of the invention with reference to the accompanying drawings, in which like reference characters designate like or corresponding parts throughout the several views, and wherein.

DETAILED DESCRIPTION OF THE PREFERRED EMBODIMENT

The present invention will now be described with reference to the illustrated embodiment.

Figure 1:
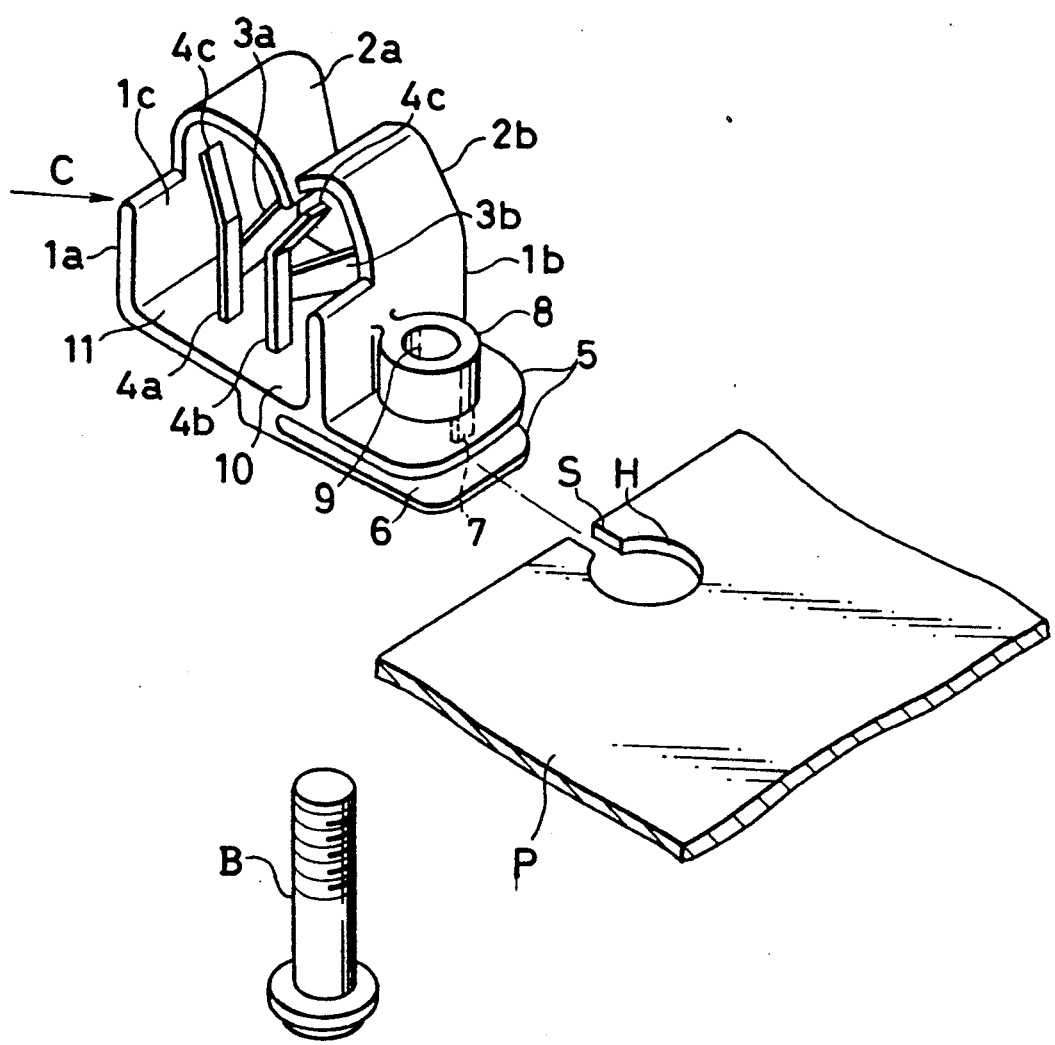
FIG. 1 is a perspective view illustrating one embodiment of the clamp constructed according to the present invention together with mounting means for the clamp.
Figure 2:
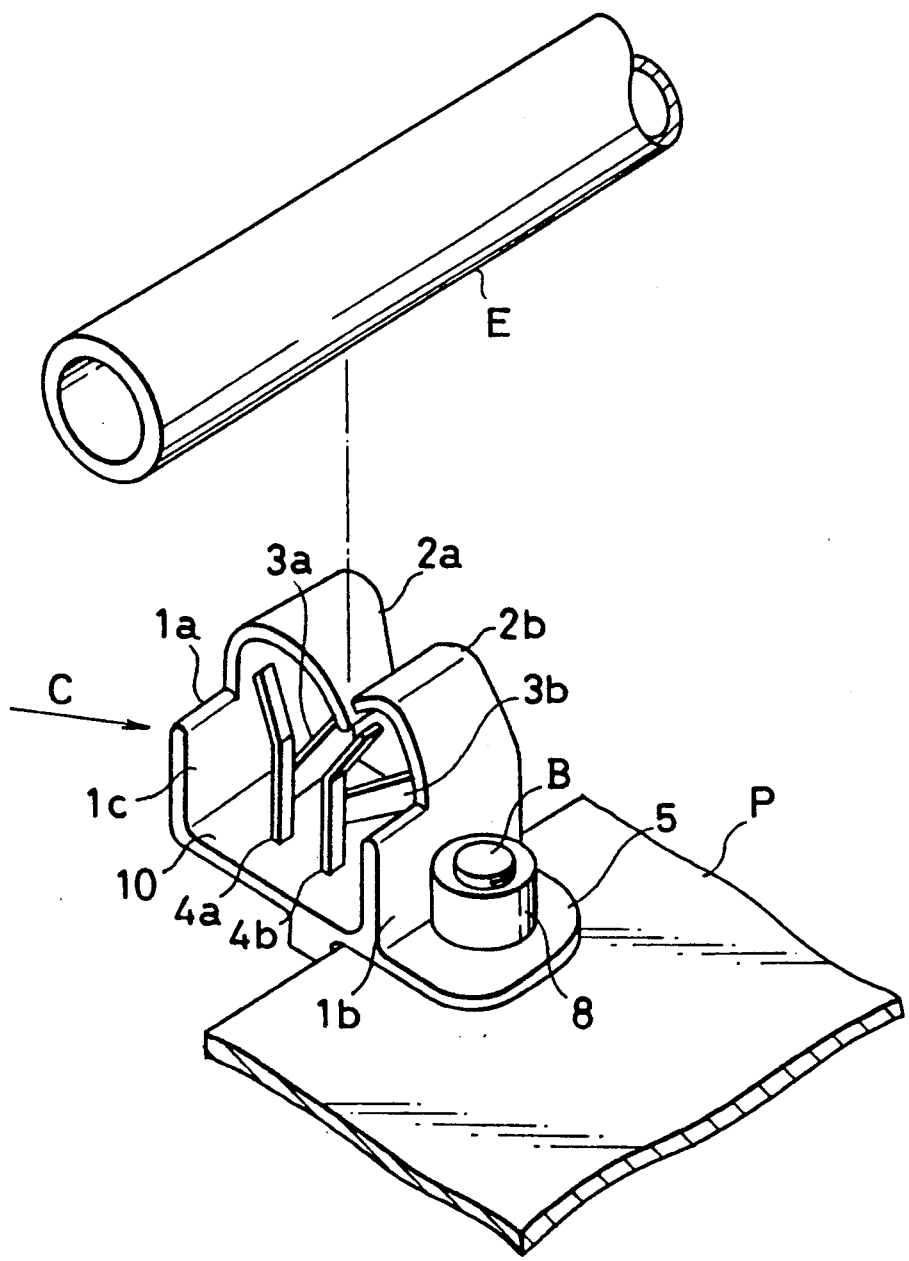
FIG. 2 is a perspective view of the clamp mounted upon the mounting means in a state ready for admitting an elongated body thereinto.
Figure 3:
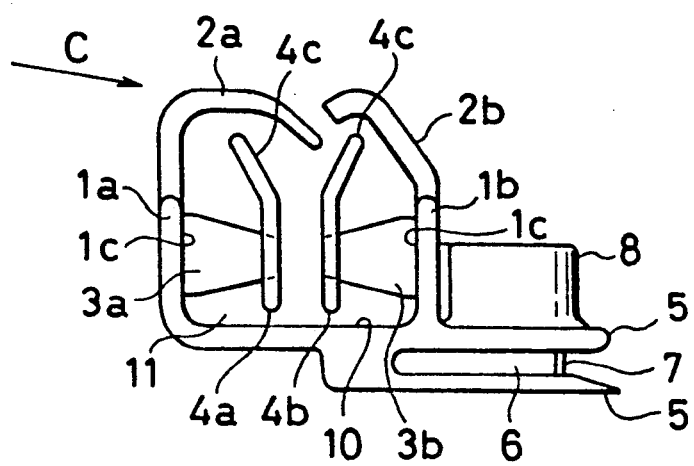
FIG. 3 is a front view of the clamp.

In FIG. 1 to FIG. 7, reference symbol C designates a clamp constructed according to the present invention which is injection molded from a synthetic resin material and which comprises a pair of opposed side walls $1a$ and $1b$ and a bottom wall $10$ extending between the side walls so as to define end openings $11$ and $12$ and an upper opening. The side walls $1a$ and $1b$ are provided with engaging pieces $2a$ and $2b$, respectively. As illustrated in FIG. 1 and FIG. 3, the engaging piece $2a$ is connected to a portion of the upper end of the side wall $1a$ so as to extend in an initially upright direction extends and then substantially horizontally such that a distal end portion thereof is bent downwardly toward the opposed side wall $1b$. The engaging piece $2b$ similarly extends upright for a short distance from a portion of the upper end of the side wall $1b$ opposite.,the aforementioned portion of the side wall $1a$ and is then bent upwardly toward the opposed side wall $1a$ so as to position the distal end thereof above the distal end of the engaging piece $2a$ of the side wall $1a$.

Figure 4:
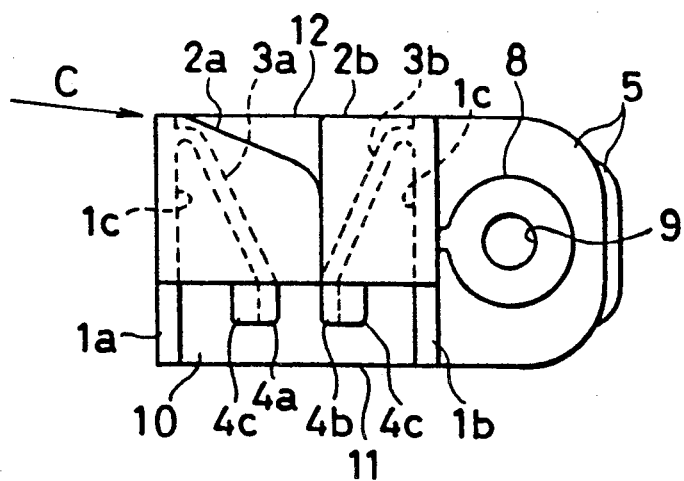
FIG. 4 is a plan view of the clamp.

As illustrated in FIG. 4, the side walls $1a$ and $1b$ have their respective inside surfaces $1c$ provided with resilient supporting pieces $3a$ and $3b$ which extend from the end opening $12$ toward the end opening $11$ so that the distance therebetween is reduced gradually toward the distal ends thereof.

Figure 6:
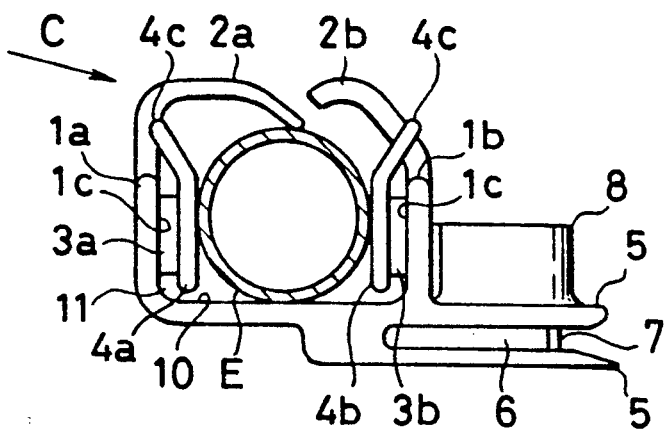
FIG. 6 is a partially sectioned front view of the clamp, with a large-diameter elongated body clamped therein.
Figure 7:
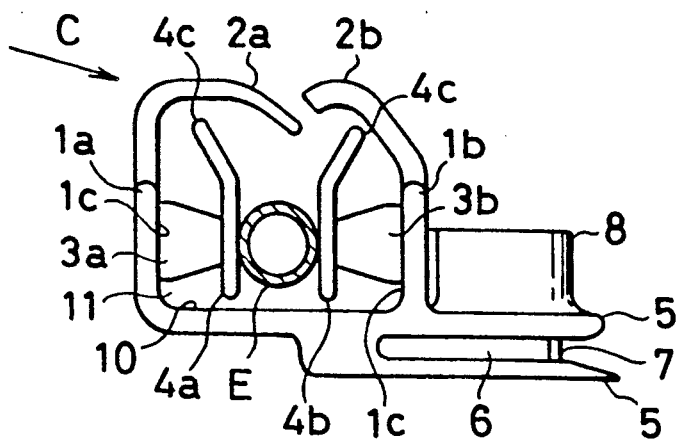
FIG. 7 is a partially sectioned front view of the clamp, with a small-diameter elongated body clamped therein.

As illustrated in FIG. 3, the resilient supporting pieces $3a$ and $3b$ are provided at their respective distal ends with guide pieces $4a$ and $4b$ which extend parallel to each other and substantially normal to the bottom wall 10 from a position disposed slightly above the bottom wall 10 to substantially the same height, as the side walls 1a and 1b and have their respective upper end portions 4c extending upwardly and apart from each other to a position slightly below the distal ends of the engaging pieces 2a and 2b, whereby an elongated body E can be guided by means of the upper portions 4c so as to be stably retained between the guide pieces 4a and 4b with exactitude, as illustrated in FIG. 6 or FIG. 7.

Figure 5:
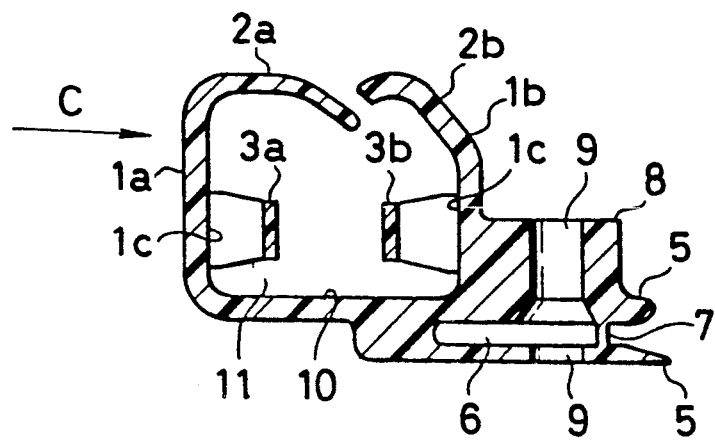
FIG. 5 is a cross sectional view of the clamp.

The clamp C has a fitting portion which, as illustrated in FIG. 5, comprises a pair of upper and lower plates 5 defining a panel insertion space 6 therebetween and having a bolt insertion hole 9, a guide pin 7 extending between the upper and lower plates 5, and a boss 8 formed upon the upper plate 5 and having the bolt insertion hole 9 penetrating therethrough. As shown in FIG. 1, a panel P of an appliance (not shown) has a hole H and a slot S communicating with each other so as to form a key hole as a whole. As illustrated in FIG. 2, the clamp C is mounted upon the appliance by inserting the panel P into the space 6 while passing the guide pin 7 through the slot S until the bolt insertion hole 9 registers with the hole H, inserting a bolt B into the bolt insertion hole 9 from below, and threadedly engaging the bolt B within the boss 8.

An elongated body E is then clamped by means of the clamp C thus mounted upon the panel P of the appliance by pushing the elongated body E against the resilient pieces 2a and 2b so that the resilient pieces 2a and 2b are flexed downwardly, then and leading the elongated body E between the diverging upper portions 4c of the guide pieces 4a and 4b of the resilient supporting pieces 3a and 3b so as to bias the guide pieces 4a and 4b away from each other. As a result, the elongated body, is resiliently supported upon or above the bottom, wall 10 of the clamp by means of the resilient supporting pieces 3a and 3b and is prevented by means of the engaging pieces 2a and 2b from escaping from the clamp C as illustrated in FIGS. 6 and 7.

The illustrated embodiment adopts two engaging pieces 2a and 2b and two resilient supporting pieces 3a and 3b. However, this is by no means limitative. For example,.. only one of the engaging pieces 2a and 2b may be formed upon only one of the side walls 1a and 1b so as to clamp the elongated body E as a result of the cooperation with the other side wall and the bottom wall 10. Alternatively, only one of the resilient supporting pieces 3a and 3b may be formed upon only one of the sidewalls 1a and 1b so as to clamp the elongated body E as a result of the cooperation with the other side wall and the bottom wall 10.

According to the present invention, as described above, since the resilient supporting pieces extend in the axial direction of the elongated body to be clamped, the elongated body can be resiliently retained upon or above the bottom wall between the resilient supporting pieces even if the elongated body should have a large or small diameter.

Therefore, it is unnecessary to prepare a plurality of clamps of different kinds in order to route or secure a plurality of elongated bodies of different diameters upon various substrates or mounting panels. In other words, the preparation of a plurality of clamps of the same kind will suffice for the purpose of mounting or securing a plurality of different elongated bodies. This enhances the distribution operation and reduces the cost required therefor.

Obviously, many modifications and variations of the present invention are possible in light of the above teachings. It is therefore to be understood that within the scope of the appended claims, the present invention may be practiced otherwise than as specifically described herein.

What is claimed is:

1. A plastic clamp for an elongated body, comprising:
   a pair of opposed side walls, and a bottom wall extending between said pair of said walls, so as to define a pair of end openings longitudinally spaced with respect to each other along a longitudinal axis of said clamp, and an upper opening;
   an engaging piece extending in an inclined manner from an upper portion of at least one of said pair of said side walls toward a lower portion of the opposed side wall; and
   a resilient supporting piece fixedly mounted upon an inside surface portion of at least one of said pair of side walls at a first proximal end portion thereof so as to extend axially in a cantilevered manner from within the vicinity of one of said end openings to the other one of said pair of end openings such that a free second distal end portion thereof is positioned to close to the opposed side wall within the vicinity of said other one of said end openings,
   said engaging piece and said supporting piece serving to clampingly retain said elongated body within said plastic clamp.

2. A plastic clamp according to claim 1, wherein said resilient supporting piece is provided with a guide piece which extends from slightly above said bottom wall to substantially the same height as said pair of side walls and has an upper portion extending upwardly toward a position slightly below a distal end of said engaging piece.

3. A plastic clamp according to claim 1, wherein:
   one of said pair of side walls comprises a fitting portion which comprises a pair of upper and lower plates defining a panel insertion space therebetween and a bolt insertion hole defined within each one of said upper and lower plates, a guide pin extending between said pair of upper and lower plates, and a boss formed upon said upper plate and having a bolt insertion hole penetrating therethrough and axially aligned with said bolt insertion holes of said upper and lower plates, whereby said clamp is able to be mounted by means of a bolt upon a panel having a hole defined therein for reception of said bolt and a slit communicating with said hole of said panel for guidingly receiving said guide pin of said fitting portion.

4. A clamp as set forth in claim 1, wherein:
   an engaging piece extends in an inclined manner from an upper portion of each one of said pair of side walls toward a lower portion of said opposed side wall; and
   a resilient supporting piece is fixedly mounted in said cantilevered manner upon each one of said pair of said walls.

5. A clamp as set forth in claim 4, wherein:
   each one of said resilient supporting pieces is provided with a guide piece, said guide pieces diverging laterally outwardly with respect to each other and away from said longitudinal axis of said clamp so as to guide said elongated body between said resilient supporting pieces as said elongated body is inserted into said plastic clamp and between said resilient supporting pieces.

6. A clamp as set forth in claim 4, wherein:
said resilient supporting pieces converge toward each other in the axial direction extending from said first proximal end portions thereof toward said second distal end portions thereof so as to flexibly engage and retain said elongated body within said plastic clamp.

* * * * *